(12) United States Patent
Rouleau et al.

(10) Patent No.: US 8,056,437 B2
(45) Date of Patent: Nov. 15, 2011

(54) ELECTRIC STEERING COLUMN LOCK WITH SINGLE DIRECTION ACTUATOR TRAVEL

(75) Inventors: James E. Rouleau, Burt, MI (US); David E. Harris, Birch Run, MI (US); Joen C. Bodtker, Flint, MI (US)

(73) Assignee: Nexteer (Beijing) Technology Co., Ltd.

( * ) Notice: Subject to any disclaimer, the term of this patent is extended or adjusted under 35 U.S.C. 154(b) by 606 days.

(21) Appl. No.: 12/114,394

(22) Filed: May 2, 2008

(65) Prior Publication Data

US 2008/0202275 A1 Aug. 28, 2008

Related U.S. Application Data

(63) Continuation-in-part of application No. 11/109,420, filed on Apr. 19, 2005, now abandoned.

(51) Int. Cl.
*B62D 1/16* (2006.01)
*B62D 1/18* (2006.01)

(52) U.S. Cl. ............................................. 74/495; 74/493

(58) Field of Classification Search .................... 74/493, 74/494, 495, 45, 47, 48, 49, 50; 280/775; 292/144, 201

See application file for complete search history.

(56) References Cited

U.S. PATENT DOCUMENTS

| | | | |
|---|---|---|---|
| 2,153,998 A | 4/1939 | Verderber et al. | |
| 3,711,139 A | 1/1973 | Polk, Jr. | |
| 4,244,237 A | 1/1981 | Sprunger | |
| 4,732,050 A | 3/1988 | Vollmer | |
| 4,810,014 A | * 3/1989 | McGourty et al. | ............ 292/144 |
| 5,301,567 A | 4/1994 | Snell et al. | |
| 5,562,306 A | 10/1996 | Rispeter | |
| 5,722,299 A | 3/1998 | Yamamoto et al. | |
| 5,829,311 A | 11/1998 | Roberson | |
| 5,931,501 A | 8/1999 | Baumann et al. | |
| 6,139,057 A | 10/2000 | Olgren et al. | |
| 6,237,438 B1 | 5/2001 | Ben Rhouma et al. | |
| 6,314,829 B1 | 11/2001 | Appleyard | |

(Continued)

FOREIGN PATENT DOCUMENTS

EP 0972694 A1 1/2000

(Continued)

OTHER PUBLICATIONS

European Search Report dated Dec. 10, 2010 for European Application No. 06075813.3-2425/1714849.

(Continued)

*Primary Examiner* — Justin Krause
(74) *Attorney, Agent, or Firm* — Cantor Colburn LLP

(57) ABSTRACT

A steering column assembly includes a column jacket coupled to a support bracket. The column jacket is moveable in a longitudinal direction along a longitudinal axis and in a pivotable direction relative to the support bracket about a pivot axis. A locking mechanism interconnects the support bracket and the column jacket, and includes a torsion shaft rotatable about a shaft axis in a first direction and a second direction to move the locking mechanism between a lock position and a release position. A motor includes an output shaft rotatable about a primary axis in a single rotational direction. A linkage interconnects the motor and the torsion shaft of the locking mechanism. The linkage is actuated by rotation of the output shaft in the single rotational direction to rotate the torsion shaft in alternating fashion between the first direction and the second direction.

14 Claims, 4 Drawing Sheets

U.S. PATENT DOCUMENTS

| | | |
|---|---|---|
| 6,419,269 B1 | 7/2002 | Manwaring et al. |
| 6,616,185 B2 | 9/2003 | Manwaring et al. |
| 6,659,504 B2 | 12/2003 | Riefe et al. |
| 6,761,376 B2 | 7/2004 | Riefe et al. |
| 6,792,824 B2 | 9/2004 | Jolley et al. |
| 6,830,267 B2 | 12/2004 | Budaker et al. |
| 6,886,859 B2 | 5/2005 | Braun et al. |
| 7,055,860 B2 | 6/2006 | Armstrong et al. |
| 7,178,422 B2 | 2/2007 | Armstrong et al. |
| 7,533,594 B2 | 5/2009 | Menjak et al. |
| 7,574,941 B2 | 8/2009 | Manwaring et al. |
| 2001/0042420 A1 | 11/2001 | Danielsson |
| 2003/0103805 A1 | 6/2003 | Braun et al. |
| 2004/0000779 A1* | 1/2004 | Armstrong et al. ........... 280/775 |
| 2005/0016315 A1 | 1/2005 | Breuss et al. |
| 2005/0092124 A1 | 5/2005 | Gaertner et al. |
| 2006/0021460 A1 | 2/2006 | Schulz |
| 2006/0230863 A1 | 10/2006 | Rouleau et al. |
| 2007/0170711 A1 | 7/2007 | Bechtel et al. |

FOREIGN PATENT DOCUMENTS

| | | |
|---|---|---|
| EP | 1070652 A2 | 1/2001 |
| EP | 1375296 A1 | 1/2004 |
| EP | 1612121 A1 | 1/2006 |
| GB | 2327257 | 1/1999 |
| GB | 2350329 | 11/2000 |
| JP | 3227754 | 10/1991 |

OTHER PUBLICATIONS

European Search Report and Office Action dated Dec. 18, 2009 for European Application No. 09158470.6.

* cited by examiner

ELECTRIC STEERING COLUMN LOCK WITH SINGLE DIRECTION ACTUATOR TRAVEL

CROSS REFERENCE TO RELATED APPLICATION

This application is a Continuation-In-Part application of U.S. Non-Provisional patent application Ser. No. 11/109,420 filed on Apr. 19, 2005, the disclosure of which is hereby incorporated by reference.

BACKGROUND OF THE INVENTION

1. Field of the Invention

The subject invention relates to an adjustable steering column assembly for a vehicle, and more specifically to an adjustable steering column assembly having an electrically actuated locking mechanism.

2. Description of the Prior Art

Steering columns often include a telescoping adjustment and/or a pivoting (rake or tilt) adjustment to adjust a position of a steering wheel. The steering columns include a locking mechanism to secure and release the telescoping adjustment and/or the pivoting adjustment. In the past, the locking mechanism was typically lever actuated by a vehicle operator. However, it has become common to utilize an electric motor to actuate the locking mechanism.

U.S. Pat. No. 7,055,860 discloses an adjustable steering column assembly having an electrically operated locking mechanism. The steering column assembly comprises a support bracket for attachment to the vehicle. A column jacket is coupled to the support bracket. The column jacket is moveable in both a longitudinal direction along a longitudinal axis and a pivotable direction relative to the support bracket about a pivot axis. The locking mechanism interconnects the support bracket and the column jacket. The locking mechanism is moveable between a lock position restricting the movement of the column jacket and a release position permitting the movement of the column jacket. An electric motor is coupled to the column jacket. The motor includes an output shaft rotatable about a primary axis. The motor drives the output shaft in a first rotational direction to release the locking mechanism and in a second rotational direction to engage the locking mechanism, i.e., the motor must operate in both a forward and reverse direction. Accordingly, the motor creates undesirable noise when reversing directions. Additionally, the vehicle must include a complex controller to control the rotational direction in which the motor drives the output shaft, depending upon the desired function, i.e., engaging or releasing the locking mechanism.

SUMMARY OF THE INVENTION AND ADVANTAGES

The subject invention provides an adjustable steering column assembly for a vehicle. The steering column assembly comprises a support bracket for attachment to the vehicle. A column jacket is coupled to the support bracket. The column jacket is moveable in at least one of a longitudinal direction along a longitudinal axis and a pivotable direction relative to the support bracket about a pivot axis. A locking mechanism interconnects the support bracket and the column jacket. The locking mechanism is moveable between a lock position restricting the movement of the column jacket and a release position permitting the moment of the column jacket. A motor is coupled to the column jacket. The motor includes an output shaft rotatable about a primary axis in a single rotational direction. A linkage interconnects the output shaft of the motor and the locking mechanism. The linkage is actuated by the rotation of the output shaft in the single rotational direction to move the locking mechanism in alternating fashion between the lock position and the release position.

Accordingly, the motor of the steering column assembly of the subject invention only operates in a single rotational direction, thereby reducing unwanted clicking or clunking noises within the vehicle caused by the motor reversing directions upon activation. Additionally, because the motor only runs in the single rotational direction, the vehicle requires a less sophisticated controller to control the operation of the motor, i.e., the controller does not need to determine which direction to run the motor for the desired operation (engaging or releasing the locking mechanism), thereby reducing the overall production cost of the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
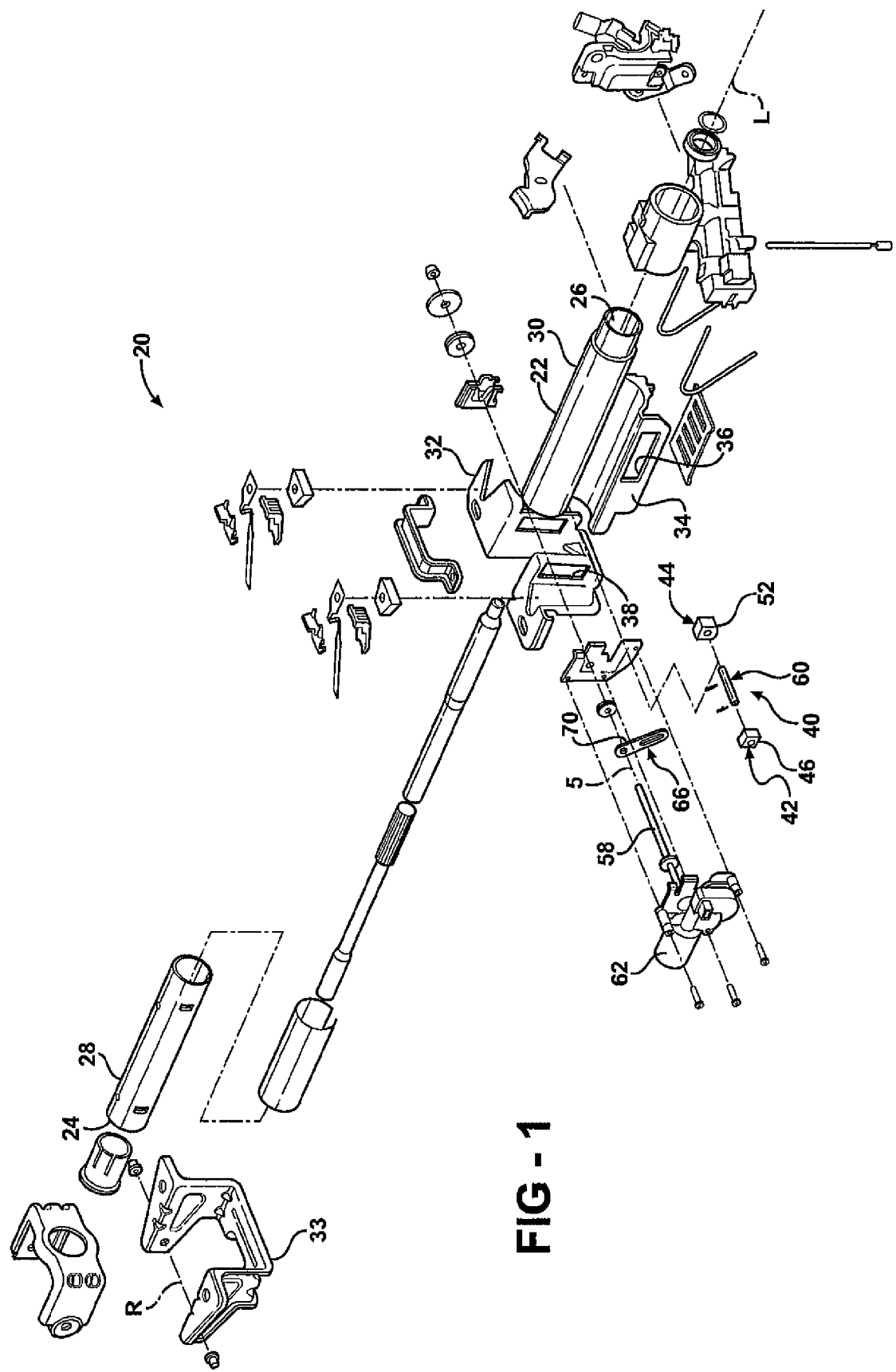
FIG. 1 is an exploded perspective view of a steering column assembly.
Figure 2:
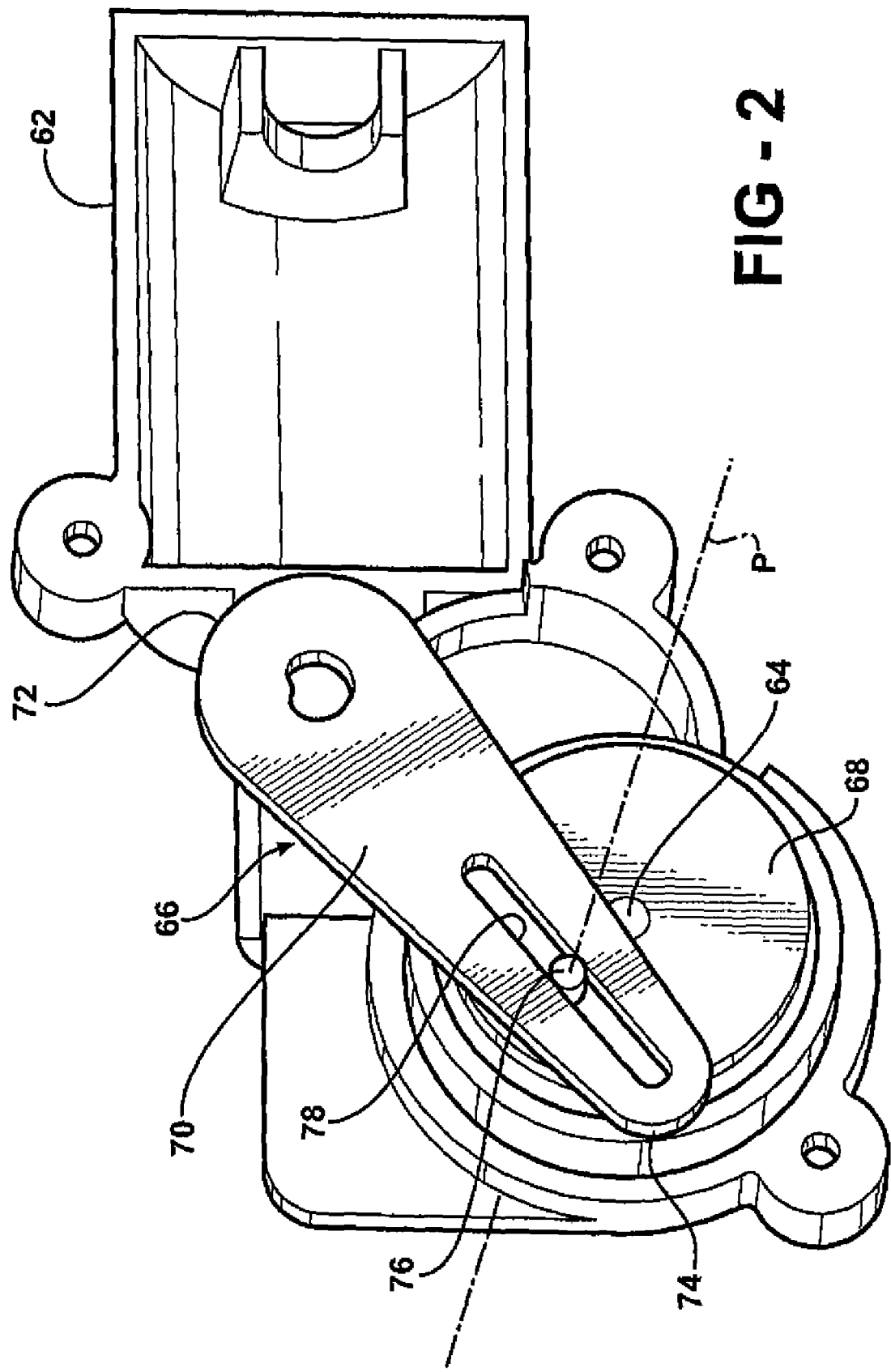
FIG. 2 is a perspective view of a motor and a linkage of the steering column assembly.
Figure 3A:
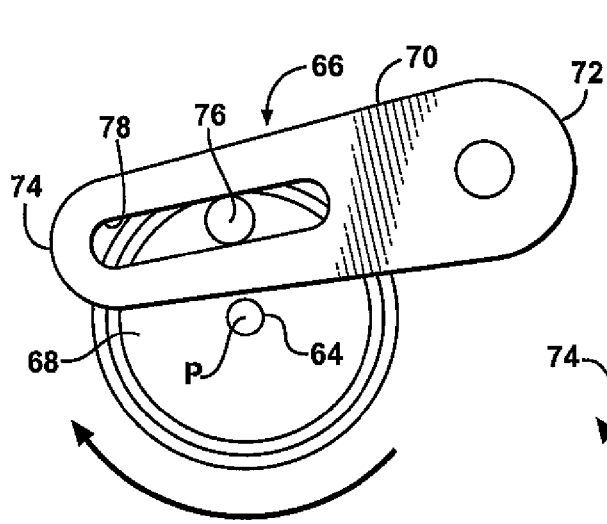
FIG. 3a is a schematic side view of a first embodiment of the linkage of the steering column assembly.
Figure 3B:
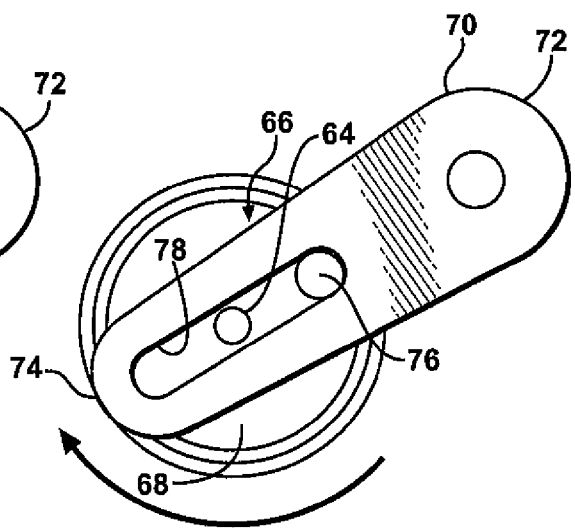
FIG. 3b is a schematic side view of the first embodiment of the linkage showing movement of the linkage.
Figure 3C:
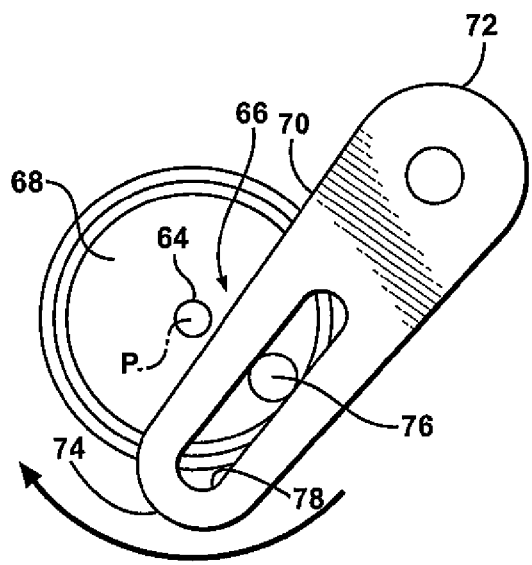
FIG. 3c is a schematic side view of the first embodiment of the linkage showing movement of the linkage.
Figure 3D:
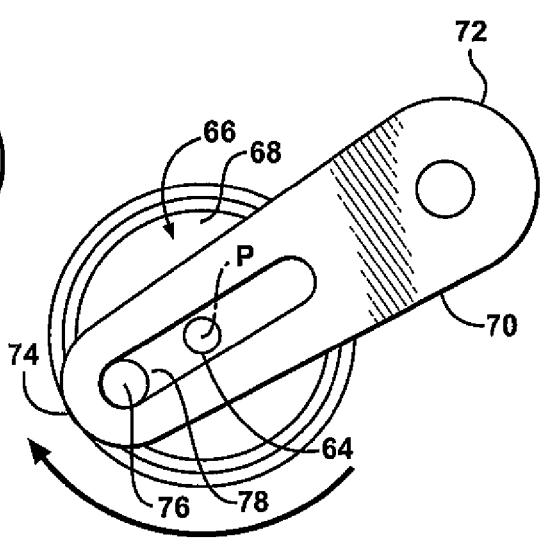
FIG. 3d is a schematic side view of the first embodiment of the linkage showing movement of the linkage.
Figure 4A:
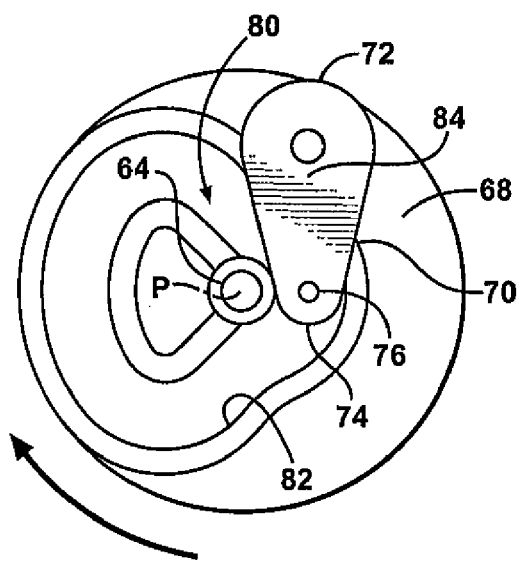
FIG. 4a is a schematic side view of a second embodiment of a linkage of the steering column assembly.
Figure 4B:
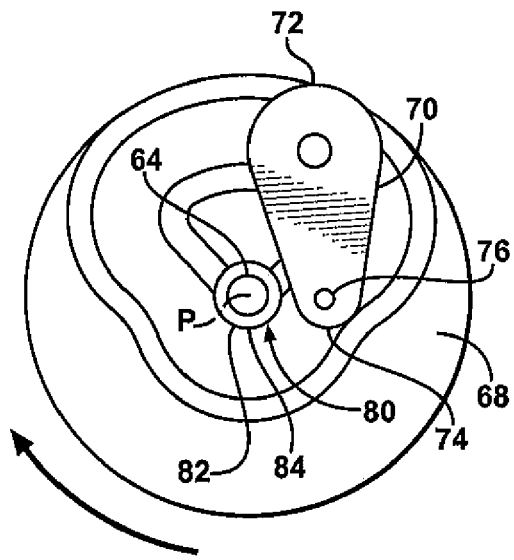
FIG. 4b is a schematic side view of the second embodiment of the linkage showing movement of the linkage.
Figure 4C:
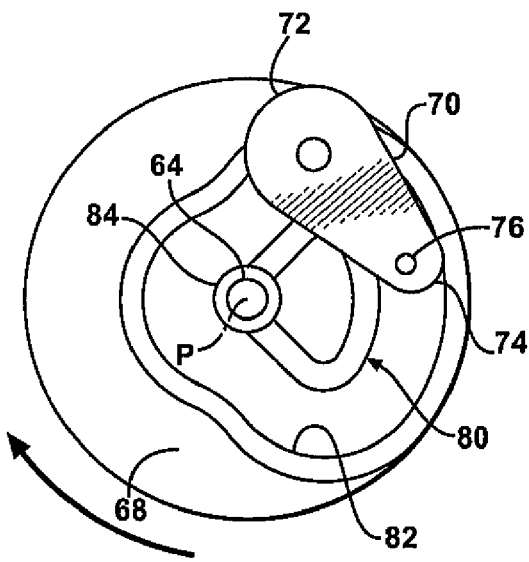
FIG. 4c is a schematic side view of the second embodiment of the linkage showing movement of the linkage.
Figure 4D:
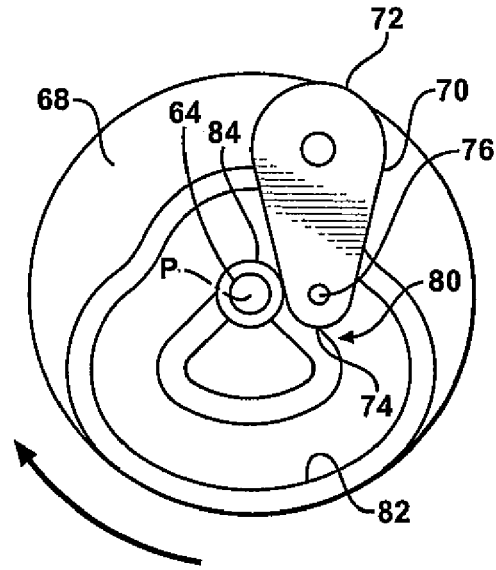
FIG. 4d is a schematic side view of the second embodiment of the linkage showing movement of the linkage.

Referring to FIG. 1, wherein like numerals indicate corresponding parts throughout the several views, an adjustable steering column assembly is shown generally at 20. The steering column assembly 20 is for a vehicle and extends along a longitudinal axis L.

The steering column assembly 20 comprises a column jacket 22. The column jacket 22 extends from a forward end 24 to a distal end 26 along the longitudinal axis L. A steering wheel (not shown) is mounted to the distal end 26 of the column jacket 22 as is well known in the art. The column jacket 22 includes an inner jacket 28 in telescopic engagement with an outer jacket 30.

The column jacket 22 is moveable in at least one of a longitudinal direction along the longitudinal axis L, i.e., a telescopic adjustment, and a pivotable direction relative to a support bracket 32 about a pivot axis R, i.e., a rake or tilt adjustment. Preferably, the column jacket 22 is moveable in both the longitudinal direction and the pivotable direction, but it should be appreciated that the column jacket 22 may only be moveable in one of the longitudinal direction and the pivotable direction.

The steering column assembly 20 includes the support bracket 32, which attaches the column jacket 22 to the vehicle. The column jacket 22 is coupled to the support bracket 32, and the support bracket 32 couples the column jacket 22 to the vehicle. The support bracket 32 may include a second support bracket 33. As shown in FIG. 1, the second support bracket 33 defines a pivot axis R. The column jacket 22 is pivotably moveable relative to the support bracket 32 about the pivot axis R in the pivotable direction to adjust a position of the steering wheel.

The steering column assembly 20 further comprises a compression bracket 34. The compression bracket 34 is mounted to the column jacket 22. Preferably, the compression bracket 34 defines a pair of telescope slots 36 parallel to the longitudinal axis L and disposed on opposite sides of the column jacket 22, and the support bracket 32 defines a pair of pivot slots 38 extending generally vertically and transverse to the longitudinal axis L, and disposed on opposite sides of the column jacket 22 adjacent the telescope slots 36. Accordingly, there is one pivot slot 38 and one telescope slot 36 adjacent each other on each side of the column jacket 22.

A locking mechanism 40 interconnects the support bracket 32 and the column jacket 22. The locking mechanism 40 is moveable between a lock position restricting the movement of the column jacket 22 and a release position permitting the moment of the column jacket 22. Preferably, the locking mechanism 40 includes a telescope locking mechanism 42 and a pivot locking mechanism 44. There are several locking mechanisms 40 suitable for use in the adjustable steering column assembly 20 known in the art, any one of which may be incorporated into the steering column assembly 20 of the subject invention and utilized for the telescope locking mechanism 42 and/or the pivot locking mechanism 44.

Preferably, the telescope locking mechanism 42 interconnects the support bracket 32 and the compression bracket 34, and is moveable between a telescope lock position restricting the movement of the column jacket 22 in the longitudinal direction and a telescope release position permitting the movement of the column jacket 22 in the longitudinal direction. The telescope locking mechanism 42 preferably includes a telescope block 46 disposed within one of the telescope slots 36 on one side of the column jacket 22. The telescope block 46 may include telescope teeth meshing with corresponding telescope grooves defined by the telescope slot 36 when the telescope locking mechanism 42 is in the telescope lock position. The telescope teeth are disengaged from the telescope grooves when the telescope locking mechanism 42 is in the telescope release position. It should be appreciated that the telescope locking mechanism 42 may include some other locking or clamping mechanism not shown or described herein, and still fall within the scope of the claims.

Preferably, the pivot locking mechanism 44 interconnects the support bracket 32 and the compression bracket 34, and is moveable between a pivot lock position restricting the movement of the column jacket 22 in the pivotable direction and a pivot release position permitting the movement of the column jacket 22 in the pivotable direction. The pivot locking mechanism 44 preferably includes a pivot block 52 disposed within one of the pivot slots 38 on one side of the column jacket 22, on an opposite side of the column jacket 22 relative to the telescope block 46. The pivot block 52 may include pivot teeth meshing with corresponding pivot grooves defined by the pivot slot 38 when the pivot locking mechanism 44 is in the pivot lock position. The pivot teeth are disengaged from the pivot grooves when the pivot locking mechanism 44 is in the pivot release position. It should be appreciated that the pivot locking mechanism 44 may include some other locking or clamping mechanism not shown or described herein, and still fall within the scope of the claims.

The locking mechanism 40 includes a torsion shaft 58 coupled to the telescope locking mechanism 42 and the pivot locking mechanism 44. The torsion shaft 58 is rotatable about a shaft axis S in a first direction to move the telescope locking mechanism 42 into the telescope release position from the telescope lock position and to move the pivot locking mechanism 44 into the pivot release position from the pivot lock position. The torsion shaft 58 is rotatable about the shaft axis S in a second direction to move the telescope locking mechanism 42 into the telescope lock position from the telescope release position and to move the pivot locking mechanism 44 into the pivot lock position from pivot rake release position. Preferably, the torsion shaft 58 extends through the telescope slot 36 and the pivot slot 38 on one side of the column jacket 22, across the column jacket 22, and through the telescope slot 36 and pivot slot 38 on the other side of the column jacket 22. The torsion shaft 58 typically activates a cam mechanism 60 for each of the telescope locking mechanism 42 and the pivot locking mechanism 44 to move the telescope block 46 and the pivot block 52 between the lock position and the release position in response to rotation of the torsion shaft 58, as is well known.

Referring also to FIGS. 2 and 3A through 3D, a motor 62 is coupled to the column jacket 22. The motor 62 includes an output shaft 64, which is rotatable about a primary axis P in a single rotational direction, i.e., the motor 62 only rotates in one direction. Preferably, the motor 62 includes an electric motor 62. However, it should be appreciated that the motor 62 may be powered by some other source other than electricity.

A linkage 66 interconnects the output shaft 64 of the motor 62 and the locking mechanism 40. The linkage 66 is actuated by the rotation of the output shaft 64 in the single rotational direction to move the locking mechanism 40 in alternating fashion between the lock position and the release position. Preferably, the linkage 66 is attached to the torsion shaft 58, and the motor 62, when activated, continuously rotates in the single rotational direction with the linkage 66 causing alternating rotation of the torsion shaft 58 between the first direction and the second direction.

The linkage 66 includes a plate 68 attached to and concentric with the output shaft 64. The plate 68 extends radially outward from the output shaft 64 for rotation with the output shaft 64. The linkage 66 further includes a lever 70 mounted to the locking mechanism 40 and coupled to the plate 68. The lever 70 includes a first end 72 adjacent the locking mechanism 40 and a second end 74 adjacent the plate 68. A peg 76 interconnects the plate 68 and the lever 70. The peg 76 is radially spaced from the primary axis P of the output shaft 64.

As best shown in FIGS. 3A through 3D, the peg 76 is fixedly mounted to the plate 68. Accordingly, the peg 76 rotates with the plate 68 to define a circular path about the primary axis P of the output shaft 64. The first end 72 of the lever 70 is mounted to the locking mechanism 40, and as shown, is fixedly attached to the torsion shaft 58. Accordingly, the first end 72 of the lever 70 is substantially fixed relative to the output shaft 64. The second end 74 of the lever 70 defines an elongated slot 78 extending transverse to the primary axis P. The peg 76 extends through the elongated slot 78, and is moveable within the elongated slot 78 in response to rotation of the plate 68 about the primary axis P.

Movement of the peg 76 about the primary axis P drives the lever 70 to move the lever 70 in a back and forth motion transverse to the shaft axis S. Therefore, as the peg 76 travels along the circular path, the second end 74 of the lever 70 moves back and forth in a transverse direction relative to the primary axis P, thereby alternatively rotating the torsion shaft 58 in between the first direction and the second direction, while the peg 76 simultaneously moves for and aft within the elongated slot 78. As such, the first end 72 of the lever 70 is rotated about the shaft axis S as the peg 76 travels through one hundred eight degrees (180°) of the circular path, and is rotated about the shaft axis S as the peg 76 travels through the remaining one hundred eight degrees (180°) of the circular path.

Referring to FIGS. 4A through 4D, a first alternative embodiment of the linkage 80 is shown. The first alternative embodiment of the linkage 80 includes the peg 76 being fixedly attached to the lever 70. The plate 68 defines an eccentric cam groove 82 radially about the primary axis P with the peg 76 disposed within the eccentric cam groove 82. The peg 76 is moveable within the eccentric cam groove 82 in response to rotation of the plate 68 about the primary axis P to move the lever 70 in a back and forth motion transverse to the shaft axis S.

The eccentric cam groove 82 includes a generally triangular shape and is disposed on a face of the plate 68. The output shaft 64 and the primary axis P are substantially located at an apex 84 of the generally triangular shaped eccentric cam groove 82. The peg 76 follows the eccentric cam groove 82 in a path that repeatedly moves the second end 74 of the lever 70 nearer to and away from the output shaft 64, resulting in alternating rotation of the first end 72 of the lever 70 about the shaft axis S of the torsion shaft 58.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustable steering column assembly for a vehicle, said assembly comprising:
    a support bracket for attachment to the vehicle;
    a column jacket coupled to said support bracket and moveable in at least one of a longitudinal direction along a longitudinal axis and a pivotable direction relative to said support bracket about a pivot axis;
    a locking mechanism interconnecting said support bracket and said column jacket and moveable between a lock position restricting said movement of said column jacket and a release position permitting said moment of said column jacket;
    a motor coupled to said column jacket and having an output shaft rotatable about a primary axis in a single rotational direction;
    a linkage interconnecting said output shaft of said motor and said locking mechanism and actuated by said rotation of said output shaft in said single rotational direction to move said locking mechanism in alternating fashion between said lock position and said release position, said linkage including a plate and a lever, said plate having a generally smooth outer perimeter, said plate attached to and concentric with said output shaft and extending radially outward from said output shaft for rotation with said output shaft, and said lever mounted to said locking mechanism and coupled to said plate, said plate configured to rotate about said primary axis to move said lever in a back and forth motion transverse to said primary axis.

2. An assembly as set forth in claim 1 wherein said linkage includes a peg interconnecting said plate and said lever.

3. An assembly as set forth in claim 2 wherein said peg is radially spaced from said primary axis.

4. An assembly as set forth in claim 3 wherein said peg is fixedly mounted to said plate and wherein said lever includes a first end mounted to said locking mechanism and a second end defining an elongated slot extending transverse to said primary axis with said peg extending through said elongated slot and moveable within said elongated slot in response to rotation of said plate about said primary axis.

5. An assembly as set forth in claim 4 further comprising a compression bracket coupled to said column jacket.

6. An assembly as set forth in claim 5 wherein said locking mechanism includes a telescope locking mechanism interconnecting said support bracket and said compression bracket and moveable between a telescope lock position restricting said movement of said column jacket in said longitudinal direction and a telescope release position permitting said movement of said column jacket in said longitudinal direction.

7. An assembly as set forth in claim 6 wherein said locking mechanism includes a pivot locking mechanism interconnecting said support bracket and said compression bracket and moveable between a pivot lock position restricting said movement of said column jacket in said pivotable direction and a pivot release position permitting said movement of said column jacket in said pivotable direction.

8. An assembly as set forth in claim 7 wherein said locking mechanism includes a torsion shaft coupled to said telescope locking mechanism and said pivot locking mechanism and rotatable about a shaft axis in a first direction to move said telescope locking mechanism into said telescope release position from said telescope lock position and move said pivot locking mechanism into said pivot release position from said pivot lock position and rotatable about said shaft axis in a second direction to move said telescope locking mechanism into said telescope lock position from said telescope release position and to move said pivot locking mechanism into said pivot lock position from pivot rake release position.

9. An assembly as set forth in claim 8 wherein said lever is fixedly attached to said torsion shaft adjacent said first end of said lever.

10. An assembly as set forth in claim 9 wherein said motor includes an electric motor.

11. An assembly as set forth in claim 3 wherein said peg is fixedly attached to said lever and wherein said plate defines an eccentric cam groove radially about said primary axis with said peg disposed with said eccentric cam groove and moveable within said eccentric cam groove in response to rotation of said plate about said primary axis to move said lever in a back and forth motion transverse to said primary axis.

12. An assembly as set forth in claim 11 further comprising a compression bracket coupled to said column jacket.

13. An assembly as set forth in claim 12 wherein said locking mechanism includes a telescope locking mechanism interconnecting said support bracket and said compression bracket and moveable between a telescope lock position restricting said movement of said column jacket in said longitudinal direction and a telescope release position permitting said movement of said column jacket in said longitudinal direction.

14. An assembly as set forth in claim 13 wherein said locking mechanism includes a pivot locking mechanism interconnecting said support bracket and said compression bracket and moveable between a pivot lock position restricting said movement of said column jacket in said pivotable direction and a pivot release position permitting said movement of said column jacket in said pivotable direction.

* * * * *